June 22, 1954  D. G. REMPEL  2,681,472
MOLDING MACHINE FOR PRODUCING PLASTIC ARTICLES
Filed Jan. 27, 1951  8 Sheets-Sheet 1

INVENTOR.
DIETRICH G. REMPEL
BY
ATTORNEYS

June 22, 1954  D. G. REMPEL  2,681,472
MOLDING MACHINE FOR PRODUCING PLASTIC ARTICLES
Filed Jan. 27, 1951  8 Sheets-Sheet 2
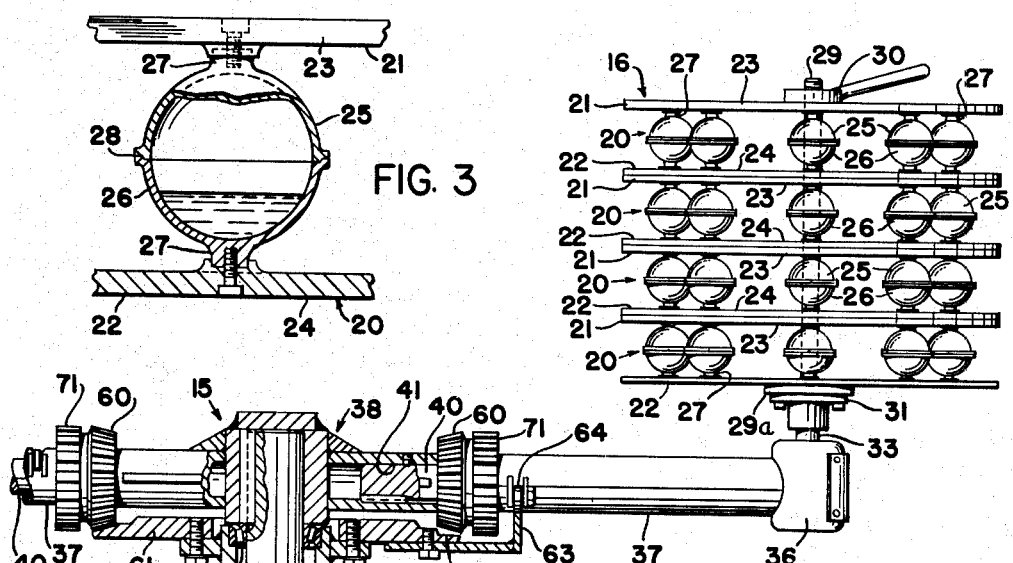
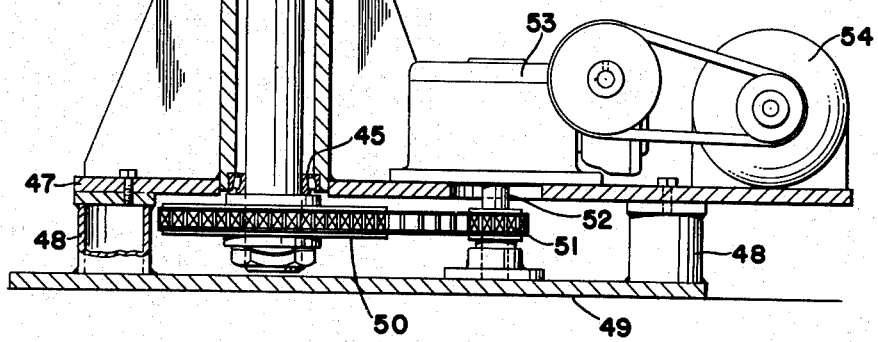
INVENTOR.
DIETRICH G. REMPEL
BY
ATTORNEYS

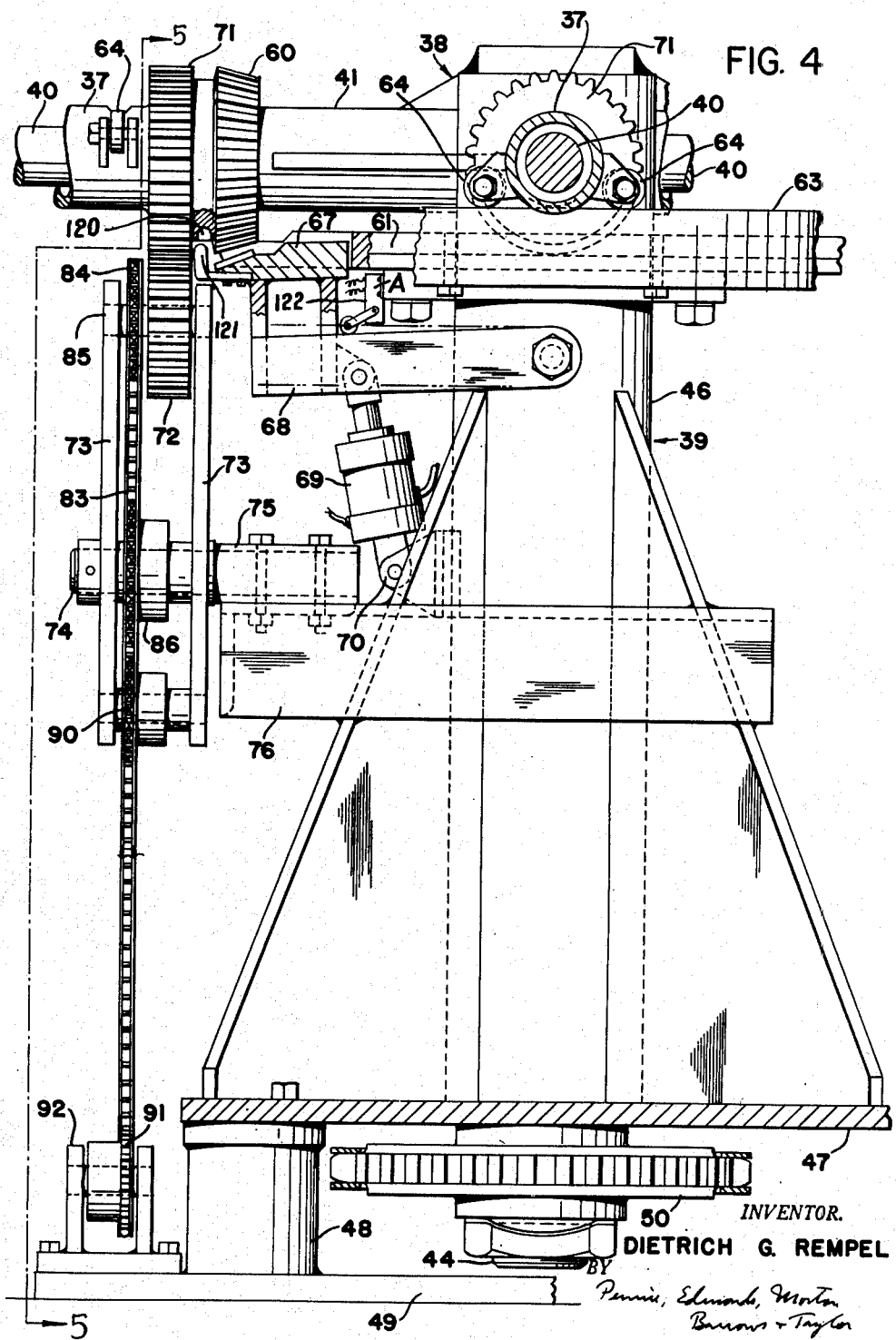

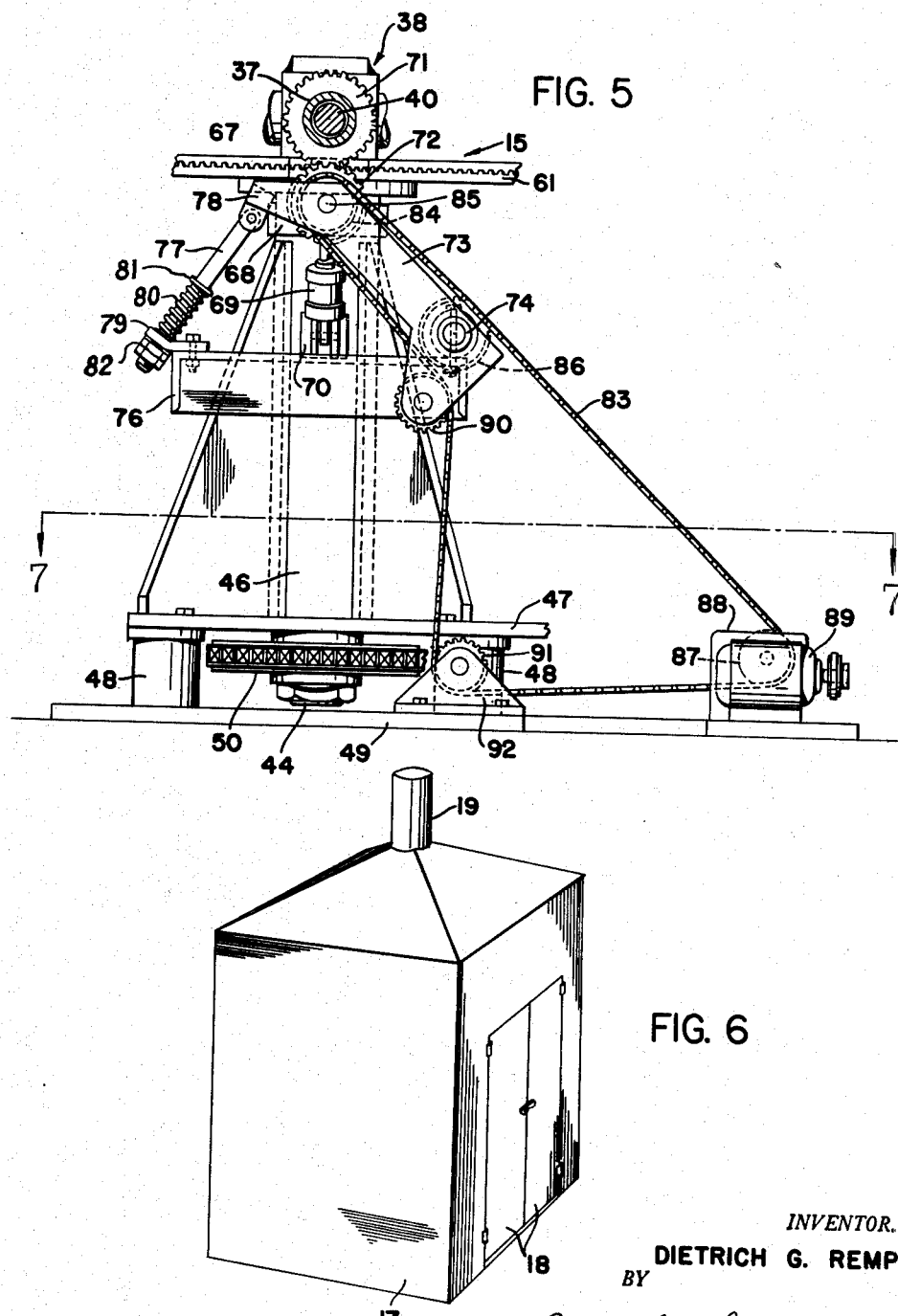

June 22, 1954  D. G. REMPEL  2,681,472
MOLDING MACHINE FOR PRODUCING PLASTIC ARTICLES
Filed Jan. 27, 1951  8 Sheets-Sheet 6
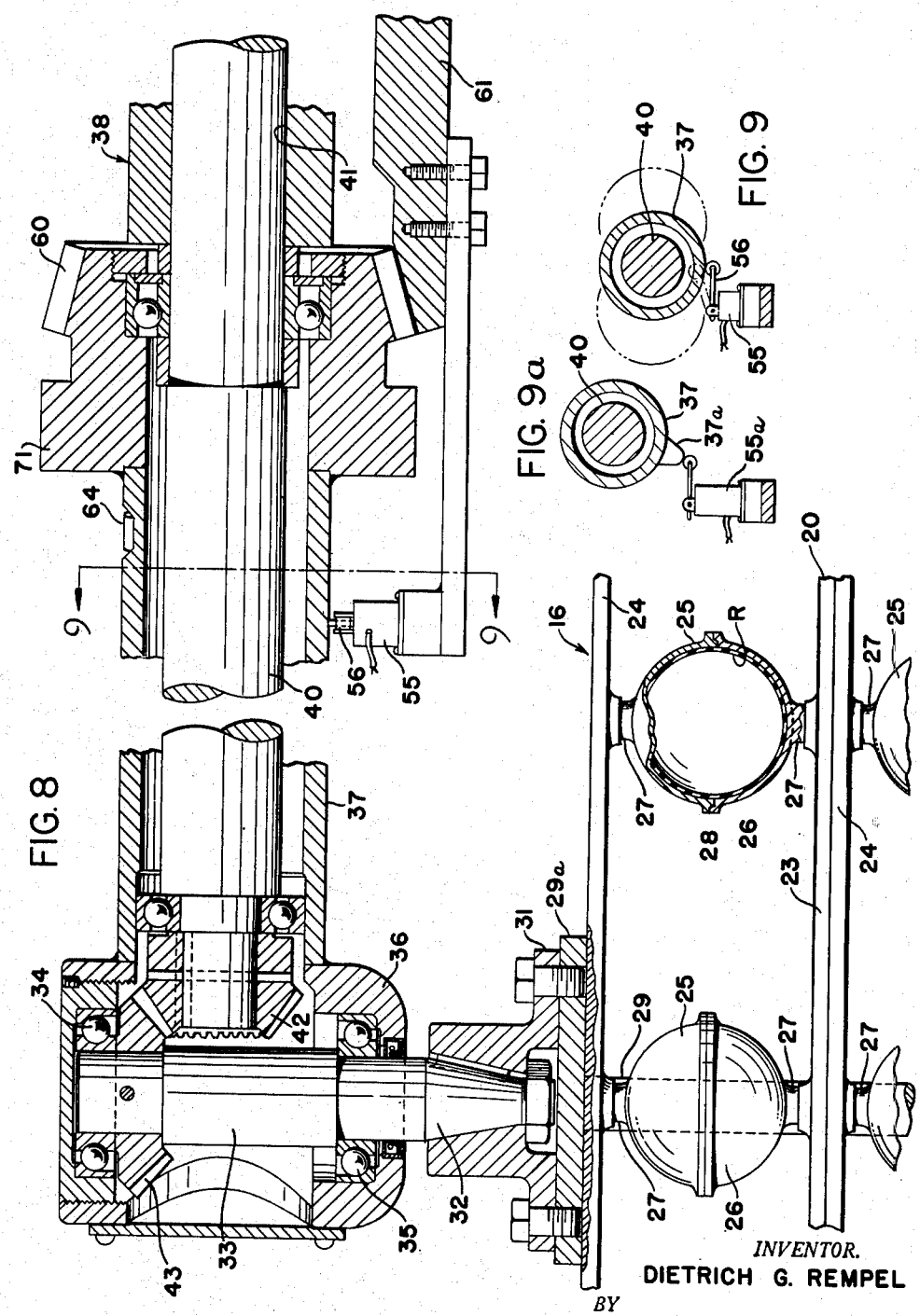
INVENTOR.
DIETRICH G. REMPEL
BY
ATTORNEYS June 22, 1954  D. G. REMPEL  2,681,472
MOLDING MACHINE FOR PRODUCING PLASTIC ARTICLES
Filed Jan. 27, 1951  8 Sheets-Sheet 7

INVENTOR
DIETRICH G. REMPEL
BY
ATTORNEYS

June 22, 1954  D. G. REMPEL  2,681,472
MOLDING MACHINE FOR PRODUCING PLASTIC ARTICLES
Filed Jan. 27, 1951  8 Sheets-Sheet 8

INVENTOR.
DIETRICH G. REMPEL
BY

ATTORNEYS

Patented June 22, 1954

2,681,472

UNITED STATES PATENT OFFICE 2,681,472

MOLDING MACHINE FOR PRODUCING PLASTIC ARTICLES

Dietrich G. Rempel, Akron, Ohio, assignor to Vinl-Cast, Inc., Akron, Ohio, a corporation of Ohio Application January 27, 1951, Serial No. 208,208

8 Claims. (Cl. 18—26)

This invention relates to apparatus for producing hollow articles of plastic material, and in particular for producing articles of certain polymerizable or like non-aqueous plastics in sectional cavity molds.

One object of the present invention is to provide an improved apparatus for producing hollow articles from polymerizable or like heat-setting, non-aqueous plastic material, which requires a relatively small amount of floor space for the equipment and a relatively short period of time to produce the articles.

Another object of the invention is to provide a compact machine for the purposes described, including improved means for mounting one or more article forming cavity molds in a unit for ready access thereto, and means for effectively moving the mold unit in a path, progressively through a series of article forming or treating zones in which the mold unit is maintained rotatable or non-rotatable in accordance with certain requirements in each said zone.

Another object of the invention is to provide apparatus of the character described in the last paragraph including improved means for draining fluids used in the process from the exteriorly exposed surface portions of the mold unit.

Other objects of the invention will be manifest from the following brief description and the accompanying drawings.

Of the accompanying drawings:

Figure 2 is an enlarged partial cross-section through said machine, taken substantially on the line 2—2 of Figure 1.

Figure 3 is a further enlarged fragmentary cross-section, through one mold cavity member of a multiple cavity mold adapted to be stacked in a unit thereof as best shown in Figure 2.

Figure 3a illustrates a ball, partly broken away and in section, made by the apparatus of the invention.

Figure 4 is a still further enlarged fragmentary cross-section, taken substantially on the line 4—4 of Figure 1.

Figure 5 is a similar fragmentary cross-section on a smaller scale, as viewed substantially on the line 5—5 of Figure 4.

Figure 6 is a perspective view illustrating the housing for the machine.

Figure 8 is a greatly enlarged fragmentary cross-section, partly broken away, taken substantially on the line 8—8 of Figure 1, and illustrating the manner of mounting the mold rotating units to be rotatable about a plurality of axes.

Figure 9 is a reduced scale cross-section taken substantially on the line 9—9 of Figure 8, showing the limit switch for intermittently stopping the machine to present the mold units in succession at the respective treating zones.

Figure 9a is a view similar to Figure 9 of another limit switch for controlling mold rotation in one of said treating zones.

Figure 1:
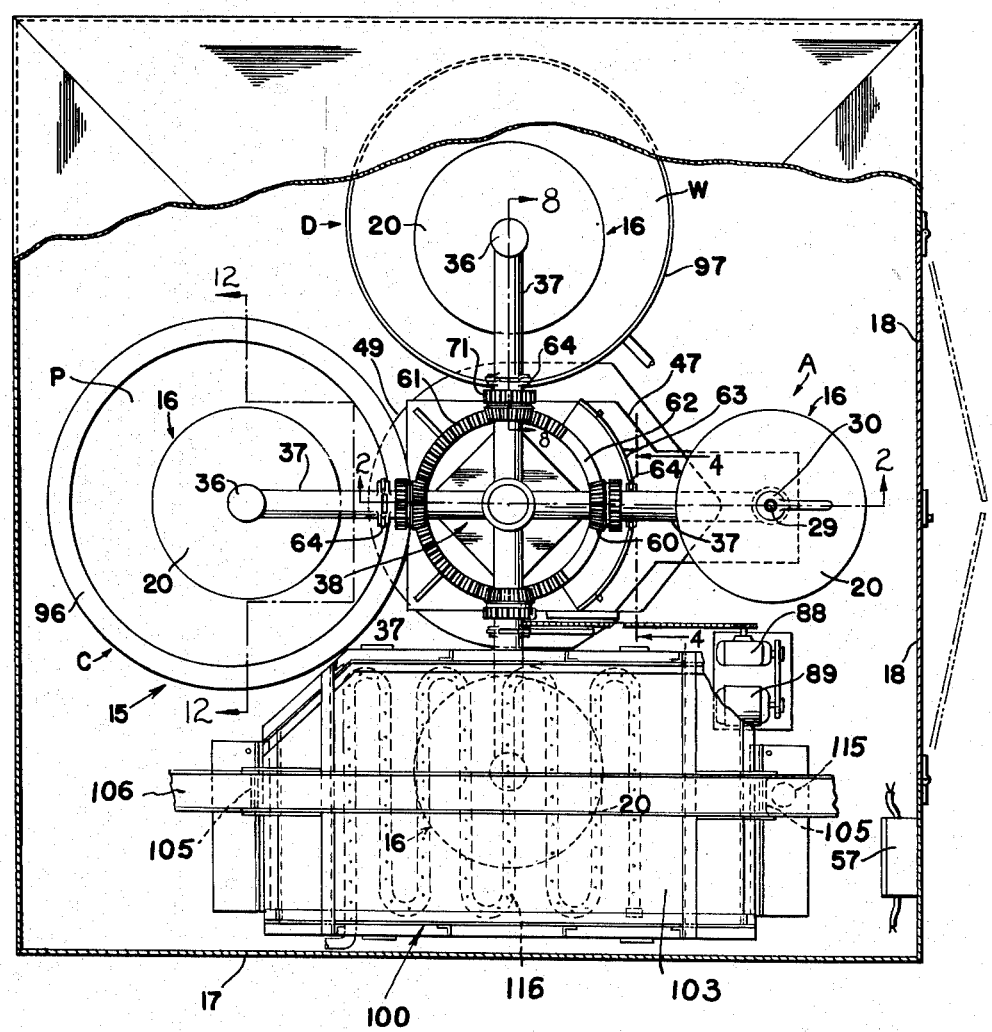
Figure 1 is a top plan view, partly broken away and in section, of a housing enclosing a machine for carrying out the improved method of the invention.

Referring particularly to Figures 1 and 2, there is illustrated machine 15 for producing hollow articles of plastic material, wherein a plurality of article forming mold units 16 are each progressively conveyed through a series of circumferentially spaced zones, including an article loading and unloading zone A, an article forming and presetting zone B, an article setting zone C, and a mold cooling zone D. As best shown in Figures 1 and 6, the entire machine may be enclosed in a housing 17, provided with doors 18 on at least one side for access to zone A for loading and unloading the molds, and with a conduit 19 at the top through which steam and other gases are withdrawn by suitable means (not shown).

Each mold unit 16, which may comprise a plurality of multiple-cavity sectional molds 20 stacked one upon the other (see Figure 3), is mounted to be moved in a circular path about a central point while being swung above and below a horizontal plane and describing a series of closed or inside loops or orbits (see Figure 13) at certain of said zones, in a manner and for purposes to be described later. The mold units 16 are also mounted to be independently rotated or swung about a plurality of angularly disposed axes during an initial article-forming stage of the operation.

Each individual mold 20, as best shown in Figures 2 and 3, may comprise top and bottom halves 21 and 22, including relatively thin, centrally apertured disc-like plates 23 and 24, to which a plurality of mating, top and bottom, article-forming cavity members 25 and 26 are suitably attached by reduced attaching portions 27. The cavity members are of non-porous material, such as aluminum, steel, or other metal, and may be of any shape, but for convenience the same are shown as being hemispherical for producing hollow elastic balls R (see Figure 3a). In any event the walls of the member halves are relatively thin and of substantially uniform thickness, with the major proportion of the outer surface portions thereof free and unobstructed to provide for maximum uniform exposure thereof to fluid-heating and cooling media and efficient conduction of heat to and from the article-forming cavity surfaces, in a manner to be described. The mating edges of said member halves are complementally grooved, as indicated at 28 in Figures 3 and 8, to provide a smooth inner wall surface for producing seamless hollow plastic articles R.

Referring now to Figures 1, 2, 5, 7 and 8, the mold units 16 are removably mounted to be conveyed as described above, on the free ends of a series of hollow arms 37, 37 (four being shown), extending radially in a horizontal plane from a hub member 38, which is mounted on an upright support 39 to be rotatable about the vertical axis of the same. To this end, a spindle plate 29a may be bolted to a flanged fitting 31, suitably keyed to an outwardly tapered extension 32 of a stub shaft 33, journalled between spaced bearings 34 and 35 in a suitable casing 36 fixed on the outer end of the respective arm 37. A spindle 29 extends freely from spindle plate 29a on the same axis as stub shaft 33, for reception through the central apertures of the mold plates 23 and 24, and the molds are clamped together against the spindle plate, in said stacked relation, by a handled nut 30 threaded on an outwardly projecting free end of the spindle and turned against the outermost mold plate 23. Thus the molds are easily removable and replaceable for the loading and unloading steps at zone A.

Each hollow arm 37 is rotatable about an axis thereof by being journalled between spaced bearings on a shaft 40 removably and non-rotatably mounted in sockets 41 on said hub member. Rotation of hollow arm 37 about relatively non-rotatable shaft 40, by means to be described, is effective to rotate the mold unit in a given direction about the axis of the shaft 40 and simultaneously to rotate the mold unit about the axis of stub shaft 33 at right angles thereto, by provision of a bevel gear 42 on relatively fixed shaft 40 meshing with a similar bevel gear 43 fixed on the stub shaft.

For mounting said hub-member 38 to be rotatable about said vertical axis thereof, a vertical central shaft 44, keyed to the hub member and supporting the same, is journalled between spaced bearings 45, 45 in a reinforced hollow tubular upright 46 of the upright support 39, extending from a mounting plate 47, which in turn is supported on a plurality of spacers 48, 48 on a base plate 49. The vertical central shaft 44 is rotatable to swing the mold units in said circular path, as by means of a chain drive from a sprocket 50 keyed to the lower end of said vertical shaft, between mounting plate 47 and base plate 49, to a sprocket 51 on a shaft 52 of a reduction gear unit 53 mounted on mounting plate 47, and unit 53 in turn driven by a motor 54.

A limit switch 55 has a spring-pressed arm 56 engageable by each radial arm 37 to operate a suitable electric timer 57 mounted on housing 17. The timer 57 includes means automatically operable to control a magnetic clutch or other suitable means (not shown), whereby at the end of each quarter turn of hub member 38 to present the respective mold units 16 in given zones A, B, C, or D, the motor 54 is stopped, with consequent stopping of the rotation of the hub member 38 for a predetermined period and the timer is automatically operable to start rotation of the hub member again at the end of each such period.

As previously indicated, two independently operable mechanisms are provided for rotating the hollow arms 37 on the hub shaft 40, one to provide rotation thereto for one purpose when the hub member 38 is rotated, and the other to provide similar rotation to each arm 37 for a different purpose, while the mold units on the respective arms are in the article-forming and presetting zone B with the hub member stopped. The first-mentioned mold rotating mechanism is best illustrated in Figures 1, 2, 4, 5 and 8, and includes a beveled gear 60 fixed on each arm 37 to rotate therewith, gear 60 being adapted to mesh with a larger beveled gear 61 suitably supported in fixed position at the upper end of the tubular upright 46 and concentric with the axis of vertical central shaft 44. A section 62 of the gear 61, within an included angle from the center of the gear approximating ninety degrees, has no teeth and radially outwardly thereof is a coextensively arcuate track 63 suitably supported by the gear 61, and upon which rides rollers 64, 64 mounted at opposite sides of the arms 37. This arrangement is such that when each rotatable arm 37 is moved into and out of the stopped position thereof at loading zone A (see Figure 1) within said included angle, the large gear 61 is ineffective to impart rotation to the said rotatable arm. In the meantime, the gear tooth proportions are such that arm 37 will have been rotated to present the mold unit 16 thereon extended vertically when the small gear 60 has left the toothed part of the large gear 61, so that the rollers 64 are free to ride onto the track 63 and maintain the mold unit in the non-rotatable elevated position thereof shown in Figure 2 when the hub member 38 is stopped in zone A by the limit switch 55 (Figure 9).

Figure 10:
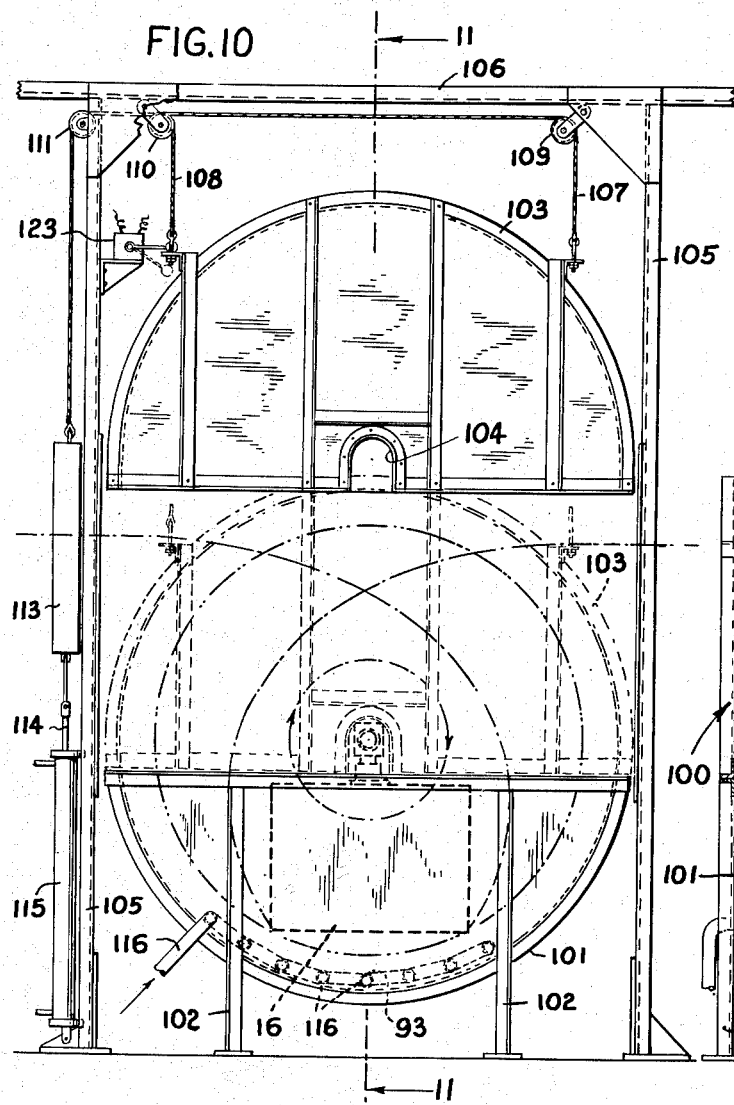
Figure 10 is an elevation illustrating a steam chamber of an article forming and presetting zone.
Figure 11:
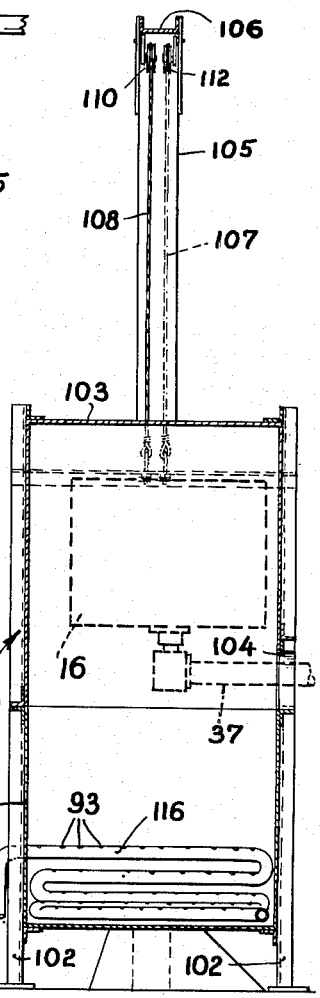
Figure 11 is a vertical cross-section through said steam chamber taken substantially on the line 11—11 of Figure 10.

At zone B there is provided a housing 100 in which the successive mold units 16 are enclosed during the preceding operations. This housing 100 is generally drum-shaped as shown in Figs. 10 and 11, and is of sufficient size to accommodate each mold unit as it is rotated about its arm 37. The housing includes a stationary lower portion 101 suitably supported on the machine base by legs 102 and a movable cover portion 103 which may be lifted to the position shown in Fig. 10 to permit each mold unit 16 to enter and leave the housing. The cover portion 103 has a downwardly open slot 104 at the lower edge of its inner vertical wall for the reception of one of the arms 37 when the cover is lowered, as shown in Fig. 11 and in broken lines in Fig. 10. A frame comprising vertical members 105 connected by a cross member 106 extends over the housing 100 and carries the cover hoisting and lowering mechanism.

Flexible cables 107 and 108 are respectively secured to the cover 103 at spaced points, as shown in Fig. 10. These cables run over pulleys 109, 110, 111 and 112 and extend downwardly outside the vertical member 105, where they are secured to a vertically movable counterweight 113. The counterweight 113 effectively balances the weight of the cover portion 103. The lower end of the counterweight is suitably connected to the piston rod 114 of an air cylinder 115 and compressed air or other motive fluid may be admitted to and exhausted from opposite ends of this cylinder to raise and lower the cover 103 in a manner which is apparent from the drawings and the foregoing description. The supply of motive fluid to the cylinder 115 is so controlled that the cover portion 103 is raised when the arms 37 are moved by the central shaft 44 between successive zones and the cover portion is lowered to closed position during periods when the arms 37 remain at the several zones.

The apertured pipe 116 is provided within the lower portion 101 of the housing 100, and heating fluid, such as steam, is admitted through this pipe through the holes 93 therein into the interior of the housing when the housing is closed.

A control switch 123 secured to one of the vertical members 105 is provided adjacent the upper or open position of the cover portion 103. As shown, the switch is arranged to be operated and closed only when the cover portion is raised to admit a mold unit to the housing.

For convenience, the remainder of the description of the machine 15 will be in terms of a cycle of operational movement of one mold unit 16, it being understood that the other three mold units are simultaneously progressed through similar stages.

In the fixed upright position of the mold unit 16 during a predetermined stop period in which the unit is not rotated, the operator, gaining access to zone A through housing doors 18 removes the mold sections 21 and 22 one at a time, removes previously formed articles R from the article-forming mold members thereof, and restacks the mold sections with predetermined quantities of fluid plastic material (to be described later) contained in said mold member. Shortly after the mold sections have been thus restacked and clamped together by the nut 30, the electric timer 57 is operable to continue rotation of the central shaft 44 and so to move the arm 37 from zone A to a stopped position of hub member 38 with said arm in article presetting zone B. The cover portion 103 of the housing 100 is raised during such movement to permit the mold unit 16 to enter the housing along the path indicated in broken lines in Fig. 10. In moving into zone B, the small gear 60 moves into meshing engagement with large gear 61 and swings the mold unit toward the vertically depending position thereof shown in dotted lines in Figure 10. This motion swings the mold unit down into the lower portion 101 of the housing 100, and the movable cover portion 103 is then lowered under suitable control, the slot 104 embracing the arm 37. A suitable period for stopping the mold units at zone A, and hence also at zones B, C, and D, has been found to be approximately seven minutes, although this period may be shorter or longer according to conditions.

Stopping the central shaft 44 at zone B stops rotation of arm 37 through meshing of gears 60 and 61. It is desirable, however, to rotate the mold unit 16 about the previously mentioned angularly disposed axes, while exposing the unit to comparatively moderated heat of open steam while enclosed within the housing 100 at zone B (see Figures 1, 10 and 11), the mold being cold or at approximately room temperature upon entry into the housing 100. Accordingly, for providing said compound rotative movement to the mold unit when the arm 37 is stopped in zone B, a small segment 67 of the toothed portion of large gear 61 is fixed on a lever 68 pivotally mounted on the fixed upright 46 to be swingable downwardly out of meshing engagement with the bevel gear 60 of the rotatable arm the instant hub member 38 is stopped, as by means of a suitable fluid-operated cylinder 69 extended between pivotal connections on the lever 68 and a bracket 70 on the fixed upright 46. At approximately the moment the central shaft 44 has thus stopped and the segment 67 has been disengaged, a second gear 71 fixed on the arm 37, outwardly spaced from gear 60, will have moved into meshing engagement with a rotating gear 72 mounted on a bracket 73 which is pivoted at 74 on an attachment 75 secured to a platform 76 extending from the tubular upright 46 (see Figures 4 and 5). Engagement of gear 71 with gear 72 is yielding against the action of a spring-pressed rod 77, pivoted at one end to an angular extension 78 of bracket 73, and having its other end slidably received through an apertured clip 79 on platform 76. Said spring-pressed action on gear 72 is accomplished by a compression spring 80 extended between the clip 79 and a fixed collar 81 on rod 77. A nut or nuts 82, threaded on the other end of the rod 77 provides an adjustable stop against the clip 79 to limit the yielding movement of the rod.

Figure 7:
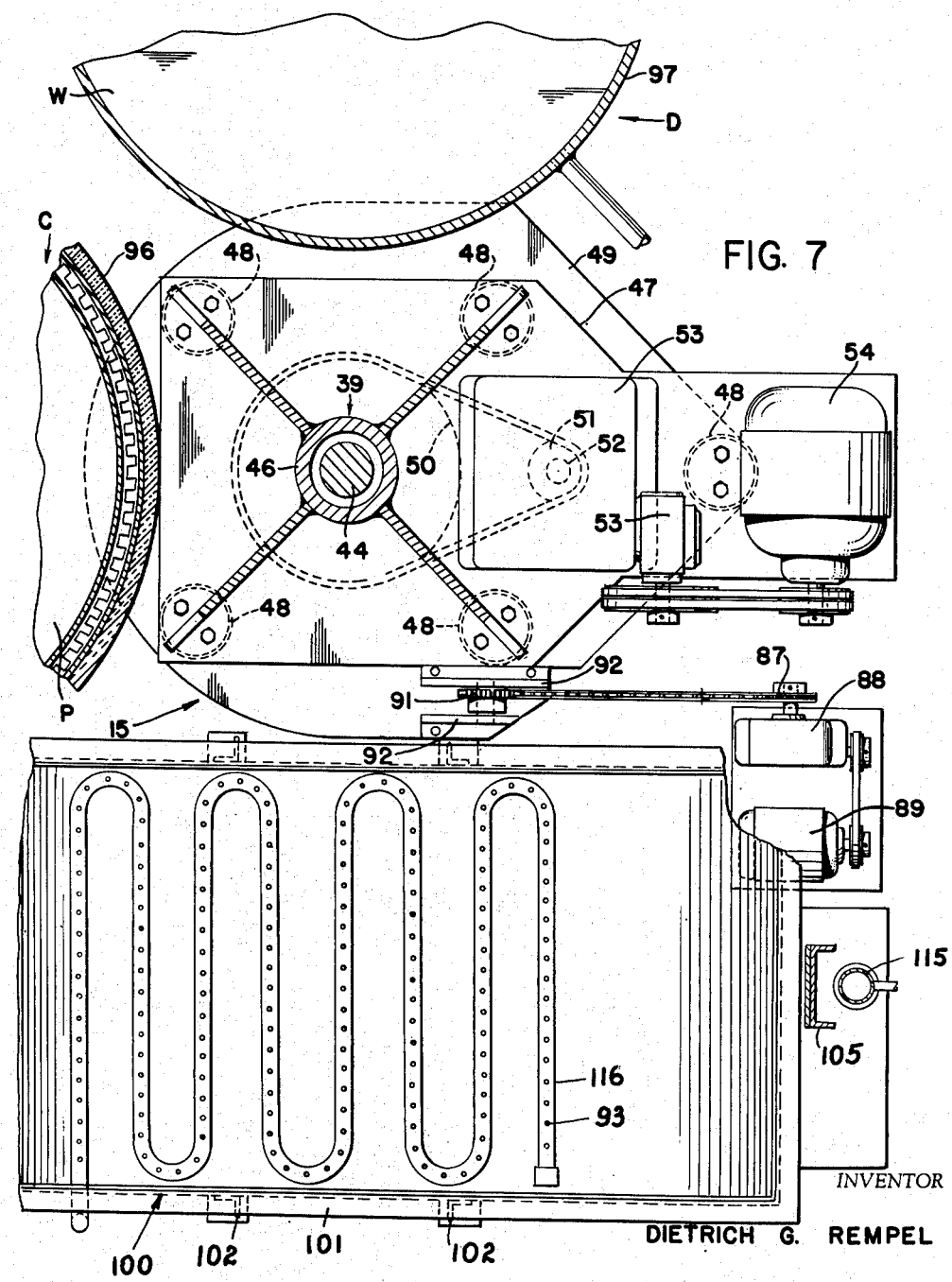
Figure 7 is an enlarged fragmentary horizontal cross-section, taken substantially on the line 7—7 of Figure 5.
Figure 11A:
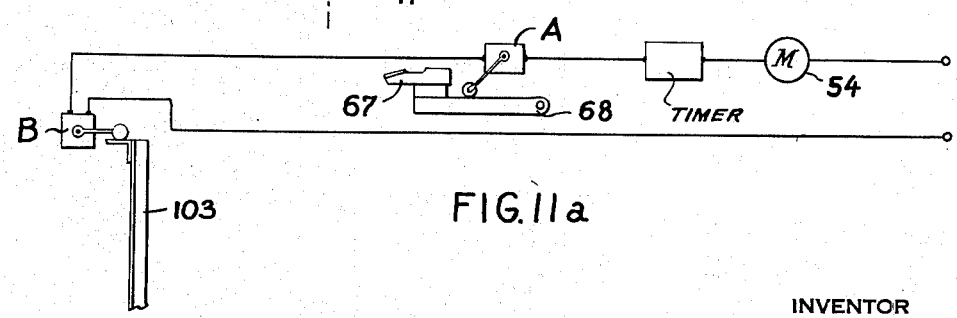
Figure 11a is a wiring diagram illustrating the electrical connections between certain control devices used on the machine.

Driving rotation of gear 72 for the foregoing purposes may be accomplished by a continuous chain 83 extending in one direction from a sprocket 84, keyed to the same shaft 85 as gear 72, and over an idler sprocket 86 on pivot 74, to a sprocket 87 on a gear reduction unit 88 driven by a reversing motor 89, the other reach of chain 83 extending from sprocket 84, over an idler sprocket 90 on bracket 73, under an idler sprocket 91 on a bracket 92 secured to base plate 49, and then to said reduction unit sprocket 87. The various sprockets are arranged to maintain the chain 83 in desired taut condition. Gear 72 may be continuously driven as it is only effective to cause compound rotation of a mold unit 16 when the respective arm 37 thereof is stopped in zone B, as described, but it is generally preferred that the motor 89 be started and stopped through the timer 57 and a control switch 55a (see Figure 9a) operable by the cams 37a on the respective arms 37. The control switch 55a is connected in parallel with the timer 57 so that the timer starts the motor 89 and the motor is deenergized and stopped by the control switch 55a with the arm 37 in a position such that the mold unit 16 extends vertically downward. In this position, an opening 120 in the hub of the bevelled gear 60 is aligned with a probe 121 fixed to the movable segment 67. At the conclusion of the period at station B, the segment 67 is moved up into mesh with the bevelled gear 60. Movement of the segment 67 to this meshing position closes a control switch 122, which is included in series with the timer 57 and the housing cover control switch 123 in the energizing circuit for the motor 54, as illustrated in Fig. 11a. With this arrangement, if the arm 37 is not in proper position when the interval at station B ends, the segment 67 will be prevented from moving into mesh with the bevelled gear 60 by engagement of the probe 121 with the hub of the gear 60. The result is that continued operation of the machine to move the mold unit 16 out of station B is dependent both on the proper terminal position of the arm 37 and on the opening of the housing cover 103. The driving engagement of gear 71 with gear 72 is effective to rotate arm 37 on its shaft 40 (see Figure 8) to swing the mold unit on a radius in a plane at right angles to the axis of rotation of the arm. Simultaneously, such rotation of arm 37 causes rolling engagement of gear 43 at the end of the arm 37 with relatively fixed gear 42 on the non-rotatable shaft 40 within the arm, thereby to rotate stub shaft 33, and correspondingly to rotate the mold unit about a central axis therethrough, in the above referred to plane of rotation thereof. That is, the mold unit is simultaneously rotated about axes disposed at right angles to each other, for the stopped interval of the central shaft 44, say said seven minutes, in which by virtue of the compound rotation of the mold unit the plastic material in the molds is progressively built up in layerings in criss-cross directions by gravitational flow thereof until all of the flowable plastic material has been formed into the ball R, as shown in Figure 8. This article-forming and presetting step commences with the molds relatively cold, or at least below a temperature which fuses or congeals the plastic material, and then steam is applied within the housing 100 progressively to preset the material, and when the resulting article R is of full thickness the material thereof will be of partially fused or polymerized, soft, jelly-like consistency. For the above purposes steam may be supplied within housing 100, through the apertures 93 in the steam pipe 116 (Figure 7). If the mold unit is rotated cold, that is, without application of steam, for a period of say two minutes, a thin coating of the fluid resin will first be applied to the bare surface portions of the mold cavities, and when the steam heat is applied for the remainder of the seven minute period there will be a desired gradual application of heat to set said progressively built up layerings, one upon the other.

Figure 12:
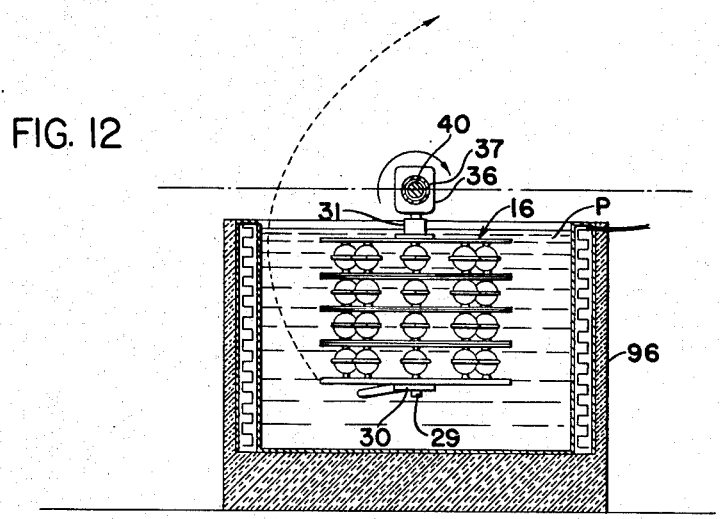
Figure 12 is a vertical cross-section, taken substantially on the line 12—12 of Figure 1, illustrating an article setting zone.

At the end of the presetting period just described, electric timer 57 is operable first to raise the cover portion 103 of the steam housing 100, then to stop rotation of the arm 37 with the mold unit 16 in the vertical depending position as explained above, and then to again rotate the central shaft 44 a quarter turn to move the arm 37 from housing 100 in zone B to zone C, where it is again stopped by engagement of arm 56 of limit switch 35 by another mold-supporting arm 37 entering zone A. In moving from zone B to zone C, arm 37 is rotated on its axis, by engagement of gear 60 thereon with the large bevel gear 61, the segment 67 having been moved up into position in the gear by the timer operated cylinder 69 at the beginning of movement of the hub member, as explained above. Rotation of the arm 37 in this manner is effective to swing the mold unit from the depending dotted line position of Figure 10, upward in continuation of the rotational clockwise circular or looping movement thereof as viewed in said Figure 10, and then downward in an arc to a vertically depending stopped position of the mold unit within an open-topped tank 96, (Figures 1 and 12) containing molten paraffin wax or heated glycerin, or other heated fluid. For heating paraffin wax P, for example, in desired molten condition, tank 96 may be electrically wired and heat-insulated, as shown in Figure 12, and suitable thermostatic means (not shown) is provided for maintaining the temperature of the wax uniform within plus or minus about two degrees. The resulting downward movement of mold unit 16 into tank 96 is effective quickly to immerse the mold unit in molten wax P or other liquid heated to relatively high curing temperature as compared with the temperature of steam in housing 100. Thus, the mold unit 16 being quickly submerged in the heated liquid P, is suddenly raised to the same temperature as the liquid, and maintained at the temperature for approximately seven minutes, as an example, during which time the preset articles in the molds become sufficiently fused, set or fully polymerized to permit removal of the articles from the molds.

Figure 13:
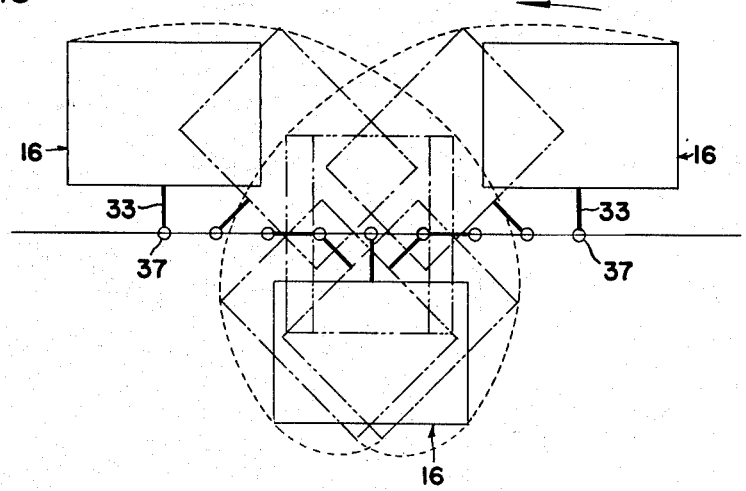
Figure 13 is a diagrammatic view illustrating, by straight line development, a portion of the path of movement of a mold unit through positions above and below a horizontal plane, intersecting to describe a closed loop.

At the end of the setting cycle in zone C, the timer 57 again causes rotation of the central shaft 44 and hub member 38 for another quarter turn, to move arm 37 from zone C to zone D, the resulting rotation of arm 37, through meshing of gears 60 to 61, causing the mold unit 16 to be swung out of the tank 96 in an arc in clockwise direction, as viewed in Figure 12, completing an inside looping movement as shown by stepped phantom positions in Figure 13, and similar to the looping movement of the mold unit into and out of steam housing 100. As will be best understood by reference to said Figure 13, this looping movement of the mold unit in an orbit about its radial shaft 40 into and out of the various zones, first rearwardly in a downward arc from a forward position relative to the front of the machine and then upwardly and rearwardly in an arc completing the inside loop, is not only very effective for draining fluids from the outer surfaces of the sectional molds of units 16, but is also of great importance in reducing the space required for the respective mold immersing steps. It is notable that as the mold unit enters and leaves each zone B, C, and D, the arcuate movements thereof offset the forward movement of arm 37 with the central shaft 44 and hub member 38.

As the rotating arm 37 is thus moved into stopped position in zone D, it is swung downwardly through the first half of said inside looping movement, and comes to rest in a depending position in a tank 97 of coolant, such as circulating water W, to reduce the temperature of the molds and articles therein so that an operator may handle the same, and to condition the molds to be at desired temperature lower than that of the steam in housing 100 at zone B, say between room temperature and about 150° F.

When the mold unit 16 has remained stationary in the cooling tank 97 for the cycle set by the timer 57, the central shaft 44 and hub member 38 are again rotated as described to complete the upward arc of the loop and swing the mold unit into the elevated position thereof shown in Figure 2, in which the arm 37 is again stopped for said cycle. In the last-named position of the mold unit 16, it is presented in the previously described upright position for opening the molds 20 thereof upon removal of nut 30 from spindle 29, for removing the completed balls R from the molds, and for replacing the mold sections in stacked and clamped relation in the unit with predetermined quantities of the plastic liquid therein. The unit 16 is then ready to start another complete cycle of operation through the respective zones B, C, and D.

The machine is particularly adaptable for forming elastic or rigid articles from non-aqueous, heat setting or fusible plastic material of known type which is supplied in a freely flowable state, which may have the consistency and viscosity of thick table cream, which when cold tends to adhere to cavity surface portions of the mold while the same is rotated, and which when heated in the mold at a relatively low temperature becomes preset with a soft jelly-like consistency, but when heated to a substantially elevated temperature will have a fully set or hardened consistency to a degree which permits removal of the finished article from the mold. Plastic materials of the type suitable for the present purposes include natural or synthetic resins admixed with plasticizers if already polymerized, admixed with a plasticizer, if it be a monomer or a mixture of monomers or viscous polymers, admixed with a hardener, if it be a synthetic resin hardenable by action of heat. A satisfactory material for the present purposes is polyvinyl resin "Geon Paste Resin 121" manufactured by the B. F. Goodrich Chemical Company, suspended in a suitable plasticizer, such as tricresylphosphate, butyl-phthalate, or the like, or any other plasticizer for polyvinyl resin. The polyvinyl resin may be polyvinyl chloride, acetate, aceto chloride, or any other polymerized resin. It is also possible to use pre-made polymers, single or mixed monomers admixed or not with a plasticizer, to which a polymerization catalyzer has been added, and which when heated will convert the mass into a gel of variable hardness depending on how far the fusing or polymerization process is carried out and how much plasticizer is present.

The method employed forms no part of the present invention, but the apparatus of this invention may be used to carry out a method which comprises generally the cold distribution of the flowable resin mixture in the mold, the gelling of the resin therein by the application of moderate heat, the setting of the resin at high temperature, and the subsequent cooling of the molds.

While a given mold unit 16 is thus stopped in fixed upright position at zone A, as shown in Figures 1 and 2, the molds 20 thereof are opened for removal of the previously completed hollow articles R therefrom, and for immediate replacement of the molds in clamped, stacked relation, with predetermined quantities of flowable, non-aqueous plastic resin contained in the article-forming cavities. In this phase of operation, the mold units are relatively cold, or approximately at room temperature, having been previously treated for this purpose in a coolant W at zone D.

At the end of the mold loading period, the mold unit 16 is swung in an arc toward the dependent position thereof in zone B, as shown in dotted line in Figure 10, and immediately upon the hub member 38 coming to rest the mold unit is simultaneously rotated about angularly disposed axes through meshing of gears 71 with driven gear 72, first for a short period (approximately two minutes) while maintaining the molds in said relatively cold condition, and then for the remainder of said seven minute period while exposing the thin-walled article-forming members 25 and 26 of the molds 20 to heat of open steam within housing 100. The temperature of this steam may approximate from 190° F. to somewhat above 212° F., but is preferably well below 250° F.

At the end of the article-forming and presetting cycle in zone B, the hub member 38 is again moved forwardly and the mold unit 16 is resultantly swung upwardly in an arc and then downwardly into the tank 96 of molten wax P (see Figure 12), where the mold unit remains immersed for a said period of seven minutes in which the hub member 38 is stopped. In this step it is not necessary to rotate the mold unit because the articles are already fully formed. Immersion in the molten wax subjects the preformed jelly-like articles R in the molds of unit 16 to relatively high temperature sufficient to complete fusion or polymerization of the particular resin material used. Because this immersion step is of relatively short duration and the temperature is substantially the same all during immersion, the finished articles will not be overcured, discolored, scorched or otherwise damaged due to exposure to excessive heat.

At the end of the fusion period at zone C, hub member 38 is again rotated a quarter turn and stopped to present the mold unit 16 under consideration again in inverted or depending position, within tank 97 at zone D, to immerse the mold unit in coolant water W, to cool both the molds 20 and the articles R therein. The molds are thus properly cooled for another full cycle of article forming steps, as well as for facilitating handling of the molds and removal of the articles R therefrom, when the hub member 38 is again moved a quarter turn to present the mold unit in upright position at zone A.

Thus has been provided an improved apparatus for producing hollow plastic articles, wherein is accomplished the stated objects of the invention. The apparatus is extremely economical because of the economy of time and space used in operating it. It is possible, for example, to perform a complete cycle operation of one mold unit 16 within thirty minutes or less.

Modifications of the invention may be resorted to without departing from the spirit thereof or the scope of the appended claims.

This application is a continuation-in-part of my copending application Serial No. 181,518, filed August 25, 1950, entitled "Apparatus and Method for Producing Hollow Plastic Articles."

I claim:

1. In a molding machine, in combination, a substantially vertical rotary central shaft, a plurality of radial shafts fixed to and extending in a horizontal plane radially outward from said central shaft, a tubular arm rotatably mounted on each said radial shaft, a mold unit including a mold unit shaft rotatably mounted on and extending from each said tubular arm radially of the arm axis adjacent the outward end thereof, a gear fixed to each of said tubular arms, a stationary gear surrounding said central shaft and engaged by said tubular arm carried gears, and a gear connection between each of said mold unit shafts and the corresponding radial shaft whereby rotation of said central shaft simultaneously rotates said tubular arms about said radial shafts and rotates said mold units in orbits about said mold unit shafts.

2. In a molding machine, in combination, a central rotary shaft, a plurality of equally spaced radial shafts fixed to and extending radially from said central shaft in a plane at right angles to said central shaft, a tubular arm surrounding and rotatably mounted on each of said radial shafts, a mold unit including a mold unit shaft mounted on each of said tubular arms adjacent its outer end and extending radially of the arm axis therefrom, means for rotating said central shaft to move said mold units about said central shaft successively to equally spaced molding operation zones, a fixed gear extending about said central shaft and a gear fixed to each of said tubular arms engaging said fixed gear whereby said mold units are turned in orbits about said radial shafts as they move between successive molding operation zones.

3. In a molding machine, in combination, a substantially vertical central rotary shaft, a plurality of equally spaced radial shafts fixed to said central shaft adjacent its upper end and extending radially therefrom in a horizontal plane, a tubular arm rotatably mounted on each of said radial shafts, a mold unit extending radially from each said tubular arm adjacent the outer end thereof and mounted on said tubular arm for rotation with said arm in an orbit about said radial shaft, a plurality of stationary open topped molding operation containers disposed at equally spaced points along a circumferential path about said central shaft and below the path of said tubular arm ends about said central shaft, a fixed gear extending about said central shaft, gears on said tubular arms engaging said fixed gear and means for rotating said central shaft to move said mold units successively to said successive molding operation containers while turning each said mold unit in an orbit about its radial shaft from a position depending into one of said containers to a position depending into the next of said containers.

4. In a molding machine, in combination, a substantially vertical central rotary shaft, a plurality of equally spaced radial shafts fixed to said central shaft adjacent its upper end and extending radially therefrom in a horizontal plane, a tubular arm rotatably mounted on each of said radial shafts, a mold unit extending radially of the arm axis from each said tubular arm adjacent the outer end thereof, and including a mold unit shaft rotatably mounted on said tubular arm, a gearing connection between each said mold unit shaft and the corresponding radial shaft whereby turning of said mold unit about said radial shaft rotates said mold unit about its shaft, a plurality of stationary open topped molding operation containers disposed at equally spaced points along a circumferential path about said central shaft and below the path of said tubular arm ends, a fixed gear extending about said central shaft, gears on said tubular arms engaging said fixed gear, means for rotating said central shaft to move said mold units successively to said successive molding operation containers while turning each said mold unit in an orbit about its radial shaft from a position depending into one of said containers to a position depending into the next of said containers, and auxiliary driving means adjacent one of said molding operation containers for rotating each tubular arm to turn the mold unit in an orbit about its radial shaft and rotate the mold unit about its mold unit shaft while said central shaft is stationary.

5. In a molding machine, in combination, a substantially vertical central rotary shaft, a plurality of equally spaced radial shafts fixed to said central shaft adjacent its upper end and extending radially therefrom in a horizontal plane, a tubular arm rotatably mounted on each of said radial shafts, a mold unit extending radially of the arm axis from each said tubular arm adjacent the outer end thereof, and including a mold unit shaft rotatably mounted on said tubular arm, a gearing connection between each said axial shaft and the corresponding mold unit shaft whereby turning of said mold unit in an orbit about said radial shaft rotates said mold unit about its shaft, a plurality of stationary open topped molding operation containers disposed at equally spaced points along a circumferential path about said central shaft and below the path of said tubular arm ends, a fixed gear extending about said central shaft, gears on said tubular arms engaging said fixed gear, means for rotating said central shaft to move said mold units successively to said successive molding operation containers while turning each said mold unit in an orbit about its radial shaft from a position depending into one of said containers to a position depending into the next of said containers, auxiliary driving means adjacent one of said molding operation containers for rotating each tubular arm to turn the mold unit in an orbit about its radial shaft and rotate the mold unit about its mold unit shaft while said central shaft is stationary, and a sector in said fixed gear movable away from an adjacent tubular arm gear to permit rotation of such arm by said auxiliary driving means when said central shaft is stopped with such tubular arm adjacent one of said molding operation containers.

6. In a molding machine, in combination, a substantially vertical central rotary shaft, a plurality of equally spaced radial shafts fixed to said central shaft adjacent its upper end and extending radially therefrom in a horizontal plane, a tubular arm rotatably mounted on each of said radial shafts, a mold unit extending radially of the arm axis from each said tubular arm adjacent the outer end thereof and including a mold unit shaft rotatably mounted on said tubular arm, a gearing connection between each said mold unit shaft and the corresponding radial shaft whereby turning of said mold unit in an orbit about said radial shaft rotates said mold unit about its shaft, a plurality of stationary open topped molding operation containers disposed at equally spaced points along a circumferential path about said central shaft and below the path of said tubular arm ends, a fixed gear extending about said central shaft, gears on said tubular arms engaging said fixed gear, means for rotating said central shaft to move said mold units successively to said successive molding operation containers while turning each said mold unit in an orbit about its radial shaft from a position depending into one of said containers to a position depending into the next of said containers, auxiliary driving means adjacent one of said molding operation containers for rotating each tubular arm to turn the mold unit in an orbit about its radial shaft and rotate the mold unit about its mold unit shaft while said central shaft is stationary, a sector in said fixed gear movable away from an adjacent tubular arm gear to permit rotation of such arm by said auxiliary driving means when said central shaft is stopped with such arm adjacent one of said molding operation containers, a probe on said movable gear sector and an opening in each of said tubular arm gears for receiving said probe whereby said movable sector is held from movement into meshing engagement with a tubular arm gear unless such arm gear is in a predetermined position.

7. In a molding machine, in combination, a central rotary shaft, a plurality of equally spaced radial shafts fixed to and extending radially from said central shaft in a plane at right angles to said central shaft, a mold unit rotatably mounted on each of said radial shafts and extending radially of the axis of the radial shaft adjacent its outer end, means for rotating said central shaft to move said mold units about said central shaft to spaced molding operation zones, a fixed gear extending about said central shaft and a gear fixedly connected to each of said mold units and engaging said fixed gear whereby said mold units are turned in an orbit about said radial shafts as they move about said central shaft between spaced molding operation zones.

8. In a molding machine, in combination, a substantially vertical central rotary shaft, a plurality of equally spaced radial shafts fixed to said central shaft and extending radially therefrom in a substantially horizontal plane, rotary means rotatably mounted on each of said radial shafts including a mold unit extending outward radially of the radial shaft axis adjacent the outer end of the radial shaft, a plurality of open-topped containers disposed at equal spaced points along a circumferential path below the path of said mold units about said central shaft, a fixed circular element extending about said central shaft in engagement with said rotary means on said radial shafts for rotating said rotary means as said central shaft rotates to move said mold units successively to said containers while turning each mold unit in an orbit about its radial shaft from a position depending into one of said containers to a position depending into the next of said containers.

References Cited in the file of this patent

UNITED STATES PATENTS

| Number | Name | Date |
|---|---|---|
| 1,341,670 | Powell | June 1, 1920 |
| 1,502,205 | McGuire | July 22, 1924 |
| 1,515,381 | Boyer et al. | Nov. 11, 1924 |
| 1,540,219 | Myers | June 2, 1925 |
| 1,691,347 | Gray | Nov. 13, 1928 |
| 1,969,323 | Person | Aug. 7, 1934 |
| 1,998,897 | Kay | Apr. 23, 1935 |
| 2,032,508 | Seiberling et al. | Mar. 3, 1936 |
| 2,222,266 | Rubissow | Nov. 19, 1940 |
| 2,270,822 | McCarroll et al. | Jan. 20, 1942 |
| 2,369,520 | Barnes | Feb. 13, 1945 |